(12) United States Patent
Somarowthu et al.

(10) Patent No.: US 12,543,652 B2
(45) Date of Patent: Feb. 10, 2026

(54) SYSTEM AND METHOD FOR IMPROVING WINDROW DRY-DOWN

(71) Applicant: Deere & Company, Moline, IL (US)

(72) Inventors: Mahesh Somarowthu, Pune (IN); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 431 days.

(21) Appl. No.: 18/310,297

(22) Filed: May 1, 2023

(65) Prior Publication Data

US 2024/0365712 A1 Nov. 7, 2024

(51) Int. Cl.
*A01D 82/02* (2006.01)
*A01B 79/00* (2006.01)

(52) U.S. Cl.
CPC ............ *A01D 82/02* (2013.01); *A01B 79/005* (2013.01)

(58) Field of Classification Search
CPC .............................. A01D 82/02; A01B 79/005
USPC ........................................................... 701/50
See application file for complete search history.

(56) References Cited

U.S. PATENT DOCUMENTS

| | | |
|---|---|---|
| 4,850,183 A | 7/1989 | Fox |
| 5,930,988 A * | 8/1999 | Hanson .................. A01D 82/00 56/192 |
| 7,987,917 B1 | 8/2011 | Kornecki |
| 8,176,991 B1 | 5/2012 | Kornecki |
| 8,984,851 B2 | 3/2015 | Pruitt et al. |
| 10,440,874 B2 | 10/2019 | Butler |
| 10,448,570 B2 | 10/2019 | Graeve et al. |
| 10,694,666 B2 | 6/2020 | Baum et al. |
| 11,089,728 B2 | 8/2021 | Wire et al. |
| 11,497,161 B2 | 11/2022 | Murray |
| 2016/0309655 A1 * | 10/2016 | Treffer .................. A01D 43/04 |
| 2017/0280627 A1 * | 10/2017 | Treffer ................. A01D 43/086 |
| 2018/0132420 A1 * | 5/2018 | Nafziger ................ A01D 57/20 |
| 2019/0257581 A1 | 8/2019 | Wray et al. |
| 2021/0015032 A1 | 1/2021 | Murray |
| 2021/0059113 A1 | 3/2021 | Wire et al. |
| 2021/0267121 A1 | 9/2021 | Childs |
| 2022/0046852 A1 | 2/2022 | Lovett et al. |
| 2022/0210974 A1 | 7/2022 | Fay, II et al. |
| 2023/0038553 A1 * | 2/2023 | Steidinger .............. A01D 82/00 |

FOREIGN PATENT DOCUMENTS

EP 3766332 A1 1/2021
EP 3912454 * 11/2021

* cited by examiner

*Primary Examiner* — Muhammad Shafi
(74) *Attorney, Agent, or Firm* — Tucker Ellis LLP; Michael G. Craig

(57) ABSTRACT

One or more techniques and/or systems are disclosed for developing appropriate settings for a windrower implement or forage harvester implement, to obtain a desired crop conditioning profile for a target crop. Field crop conditions may vary due to soil conditions, moisture content, and the operator may wish to get crop uniformity when collected. As such, a profile can be developed that provides adjustment data to actuators to adjust machine setting, to provide for a conditioning systems to obtain a desired result. The adjustment data can be generated based on such as the moisture content of the target crop, the target moisture content, and the dry-down characteristics for the crop. The profile can help set the harvesting system to provide appropriate cut and crimp to result in a desired dry-down time to get uniformity in the collected crop.

13 Claims, 7 Drawing Sheets

SYSTEM AND METHOD FOR IMPROVING WINDROW DRY-DOWN

BACKGROUND

In an agricultural setting, crop materials are often cut, conditioned, arranged into windrows, and/or otherwise processed. In some cases, the crop materials may be raked, chopped, and/or baled as well. Certain work vehicles are provided for these activities. Some harvesting work vehicles and attachable equipment, such as conditioning work vehicles and/or windrowing work vehicles, may include implements for cutting, conditioning, and/or arranging the crop material into a windrow as the work vehicle moves across a field. Typically, the configuration of these implements may be changed or adjusted based on the target project/crop/situation. For example, the position of the implements on the work vehicle may be selectively changed, and these implements can also be manually adjustable for desired results in most cases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for automatically developing appropriate settings for a windrower implement or forage harvester implement, which may be towed or self-propelled, such as those used to condition hay, alfalfa, silage, etc. For example, some crops are cut and conditioned into a windrow for seasoning (e.g., drying) for later collection and storage. In implementations described herein, field crop conditions may vary due to soil conditions, moisture content, etc., and the operator may wish to get crop uniformity when collected. As such, a profile can be developed that allows the operator to set the conditioning systems (e.g., rollers, crimpers, etc.) used to condition the crop (e.g., crimp the cut crop) to obtain a desired result based on several factors such as the condition of the crop, the condition of the weather, harvester, and more. That is, for example, the profile can help the operator set the harvesting system to provide appropriate cut and crimp to result in a desired dry-down time to get uniformity in the collected crop across a worksite.

In one implementation of a system for automatically adjusting a crop conditioner assembly on a windrower machine, an actuator controller can operably receive input data indicative of several input data. The input data can comprise: a current crop moisture characteristic; a target crop moisture characteristic; and a crop dry-down characteristic. Further, the actuator controller can comprise a computer processor and memory. In this implementation, the memory can store instructions that are configured to, when processed by the computer processor, generate actuator adjustment data indicative of an adjustment to a roller assembly in a windrower machine. The adjustment data is used to meet a predetermined crop conditioning characteristic, and is generated based at least upon the current crop moisture characteristic, target crop moisture characteristic, and crop dry-down characteristic. Additionally, one or more actuators may be used to adjust the roller assembly of the windrower implement based at least on the adjustment data.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
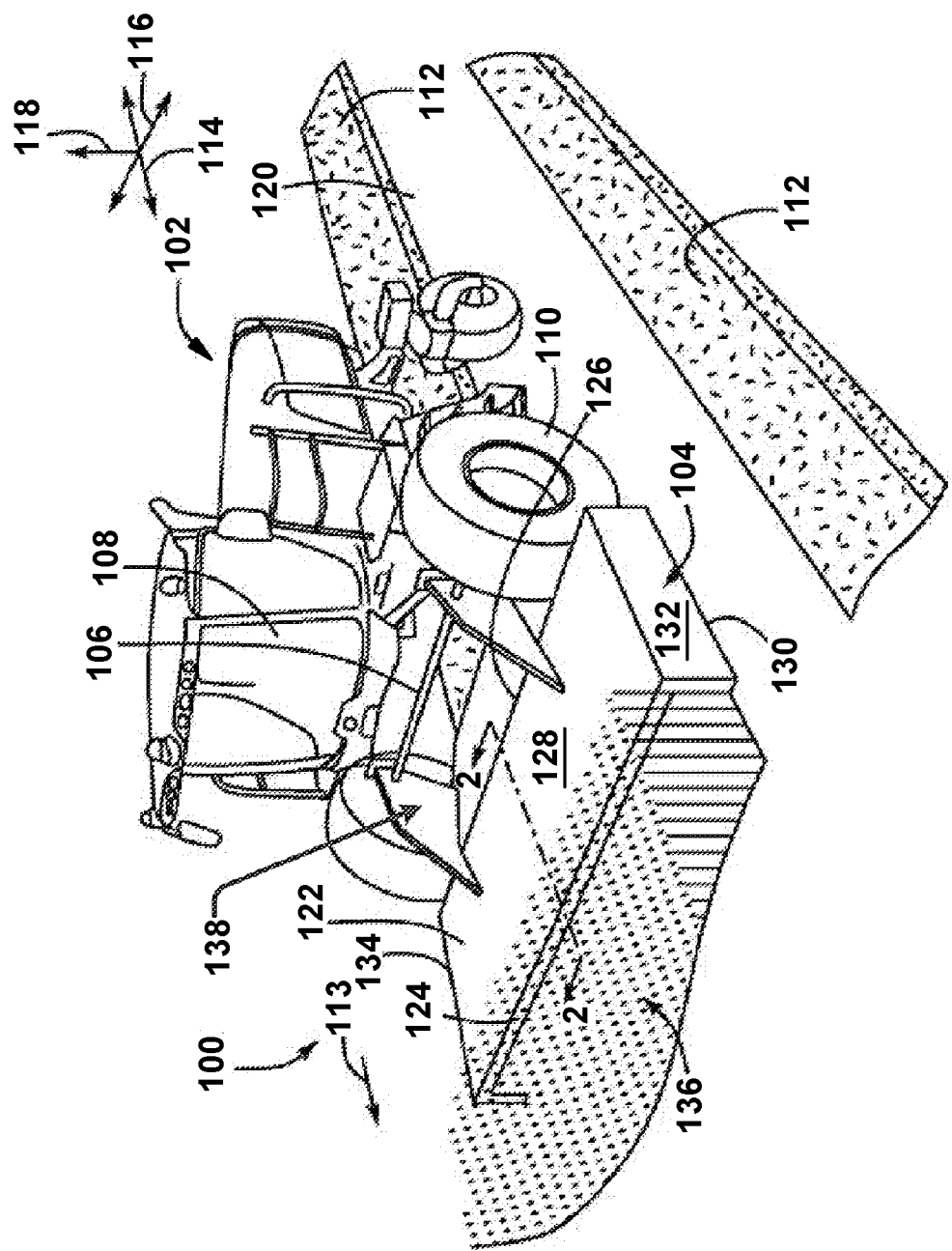
FIG. 1 is a component diagram illustrating one implementation of an example vehicle that may implement one or more systems and methods described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In some aspects, there is a desire to have a field of forage crop to dry down to a relatively uniform moisture content before collecting and baling/storing. Often, a crop's initial moisture content may very across a field or target operation location, as can the conditioning or dry-down characteristics for the crop (e.g., based on the effect of crimp, sun, wind, humidity, windrow shape, etc.). Further, based on the operator's workload, expected weather conditions, end-use characteristics, capacity, etc., a desired target time can be developed for the conditioning, such that the conditioned crop can be collected within the target time.

As described herein, one or more systems and methods can be devised that provide for developing a conditioning profile for a target crop, at a target location, using target equipment, and adjusting equipment settings to meet the conditioning profile (e.g., time, moisture, etc.). The conditioning profile can provide adjustment settings to an operator, and/or may provide for automatic adjustments using a controller to operate actuators in the equipment to make adjustments as needed to meet the profile.

For example, the conditioning profile can provide for effectively adjusting crop conditioning assemblies, such as a roll gap and/or roll tension, speed of rollers, activating additional crimpers, for conditioning rollers in a rotary header for harvesting operations. In one aspect, these adjustments can facilitate crimping operation on a cut crop in order to improve dry down time (e.g., relatively increase or decrease dry-down), while mitigating leaf loss of the target crop, and crop losses that may result from undesirable force applied to the cut crop during conditioning. For example, as described below, forage harvesting machines are used to cut a target crop and create windrows of the resulting cut crop. The windrowing machine typically has a header coupled to the front (e.g., alternately the rear) of the machine. In this example, the header has a conditioner roller assembly, with conditioning rollers, which are used to crimp the cut crop to help it dry down. In some implementations, the adjustments can be made on the fly to meet the profile based on varied crop moisture levels in a target location. In this way, a more uniform crop moisture can be obtained for the collected crop.

That is, for example, the cut crop is crimped by the roller assembly, where the crimping action helps break the outer shell of the crop stems. This breakage of the shell facilitates moisture removal (e.g., through evaporation), resulting in a faster dry down of the target crop. In this example, a smaller roll clearance, results in greater crimping, which can result in an improved drying rate. However, a smaller roll clearance can also result in greater leaf loss, which is undesirable. Further, the roller assembly may comprise a plurality of rollers, where one or more may be activated to provide for additional crimping. Currently, an operator must pre-set the roll gap and roll tension in a known target position to achieve a known drying rate, with an allowable amount of leaf loss. In this example, the adjustment must be made even during harvesting by the operator based on changing crop size and changing crop conditions.

In one aspect of the innovation described herein, a conditioning profile can be developed based at least on: a crop moisture characteristic; a target crop moisture characteristic; and a crop dry-down characteristic (e.g., known crop dry-down data). In this aspect, a crop dry-down analyzer, such as a trained model, can be stored in memory, and executed by a processor. Further, the result of the analysis can generate one or more commands that actuate one or more actuators that vary crop conditioning characteristics for the target equipment. The crop conditioning characteristics are adjusted to meet the target crop moisture based on the crop moisture characteristics and the crop dry-down characteristics. In some implementations, the stored instructions are indicative of a supervised machine learning algorithm, which utilizes an ensemble learning method for regression.

As one example, the instructions may implement one or more control schemes to generate adjustment data 216 from input data 214 and conditioning profile 220. If multiple schemes are simultaneously used, one may be selected based on an estimated quality metric or multiple results may be combined through, for example, weighted addition of the scheme adjustment data. The control scheme may comprise formulas, table look-ups with interpolation, rules, fuzzy logic, neural networks, or any other suitable scheme. In some examples, performance may be improved via machine learning. That is, the input data, weather data, adjustment data, and conditioning profile may be georeferenced and saved. At a later time, georeferenced actual crop moisture data at the time the crop is harvested (e.g., baled, combined, etc.) may be collected. The as-harvested data is used in a machine learning model to improve future performance of the system. Examples of learning models, without limitation, include neural-fuzzy retraining, re-enforcement learning, and retraining of neural networks with the expanded data set.

As an example, a target roll gap and/or roll tension can be estimated on-the-fly and applied to the roller assembly based on header load measurements, crop parameters, and other data collected in real-time. Further, one or more additional rollers may be activated to apply additional crimping to the target crop, as needed. As an example, moisture distribution data indicative of moisture distribution of the crop in the harvested crop can be utilized, for example; and a control system can generate control signals to automatically adjust roll gap and/or roll tension, etc. in the roller assembly based on the processed data.

As an illustrative example, FIG. 1 illustrates a component diagram of an example work vehicle and associated equipment that may utilize the techniques and system described herein. As illustrated in FIG. 1, a harvesting work vehicle, such as a windrower 100, is illustrated as one example implementations of an embodiment of the present disclosure. In some implementations, the windrower 100 may be a self-propelled machine. However, the systems and methods described herein may be equally applicable to towed machines, or other configurations, as will be appreciated by those having skill in the art. Furthermore, although harvesting work vehicles that mow, condition and windrow crop materials are sometimes interchangeably referred to as mower-conditioners, windrowers, or forage harvester, for the sake of simplicity, such machines will be referred to herein as "windrowers." Further, one or more portions of the methods and systems described herein may apply other harvesting work vehicles or to construction and forest harvester vehicles.

Machines that collect and condition crop material, and form a windrow from the same material are discussed according to implementations of the present disclosure; however, it will be appreciated that the present teachings may apply to machines that form windrows without necessarily conditioning the crop material. The present teachings may also apply so to machines that condition (crimp, crush, etc.) crop material without necessarily forming a windrow. Furthermore, the systems and methods of the present disclosure may apply to harvesting of various types of crop materials, such as grasses, alfalfa, silage, or otherwise. Accordingly, it will be appreciated that a wide variety of machines, systems, and methods may fall within the scope of the present disclosure.

In some implementations, the windrower 100 broadly comprises a self-propelled tractor 102 and a header 104 (i.e., header attachment). The header 104 may be attached to the front 138 of the tractor 102. The tractor 102 may include a chassis 106 and an operator compartment 108 supported atop the chassis 106. The operator compartment 108 may provide an enclosure for an operator and for mounting various user control devices (e.g., a steering wheel, accelerator and brake pedals, etc.), communication equipment and other instruments used in the operation of the windrower 100, including a user interface providing visual (or other) user control devices and feedback. The tractor 102 may also include one or more wheels 110 or other traction elements (e.g., tracks) for propelling the tractor 102 and the header 104 across a field or other terrain. The windrower 100 may form a windrow 112 as it moves along a travel direction indicated by the arrow 113.

The windrower 100 may define a coordinate system, such as a Cartesian coordinate system having a longitudinal axis 114, a lateral axis 116, and a vertical axis 118. The longitudinal axis 114 may be substantially parallel to the travel direction 113. The lateral axis 116 may be horizontal and normal to the longitudinal axis 114 to extend between opposing sides of the windrower 100. The vertical axis 118 may extend vertically and normal to the longitudinal axis 114, the lateral axis 116, and the ground 120.

The header 104 may generally include a frame 122, which is mounted to the chassis 106. The frame 122 may be mounted for movement relative to the chassis 106. For example, the frame 122 may move up and down, at least partly, along the vertical axis 118 relative to the chassis 106 and relative to crop material 136. In some implementations, the frame 122 may tilt and rotate about an axis that is parallel to the lateral axis 116. Also, the frame 122 may comprise one or more support elements for supporting implements (e.g., arrangement of implements, etc.).

The frame 122 may generally include a front end 124 and a rear end 126. The rear end 126 may be spaced apart along the longitudinal axis 114 and may be attached to the chassis 106 of the tractor 102. The frame 122 may also include a top structure 128 and a lower area 130, which are spaced apart along the vertical axis 118. Furthermore, the frame 122 may include a first lateral side 132 and a second lateral side 134, which are spaced apart along the lateral axis 116.

In the implementation illustrated in FIG. 1, and discussed below, the front end 124 is open to receive crop material 136 as the tractor 102 moves across the field. In some implementations, the windrower 100 cuts the crop material 136, then conditions the crop material, and then shapes, places and/or arranges the crop material 136 into the windrow 112 as the tractor 102 moves.

Figure 2:
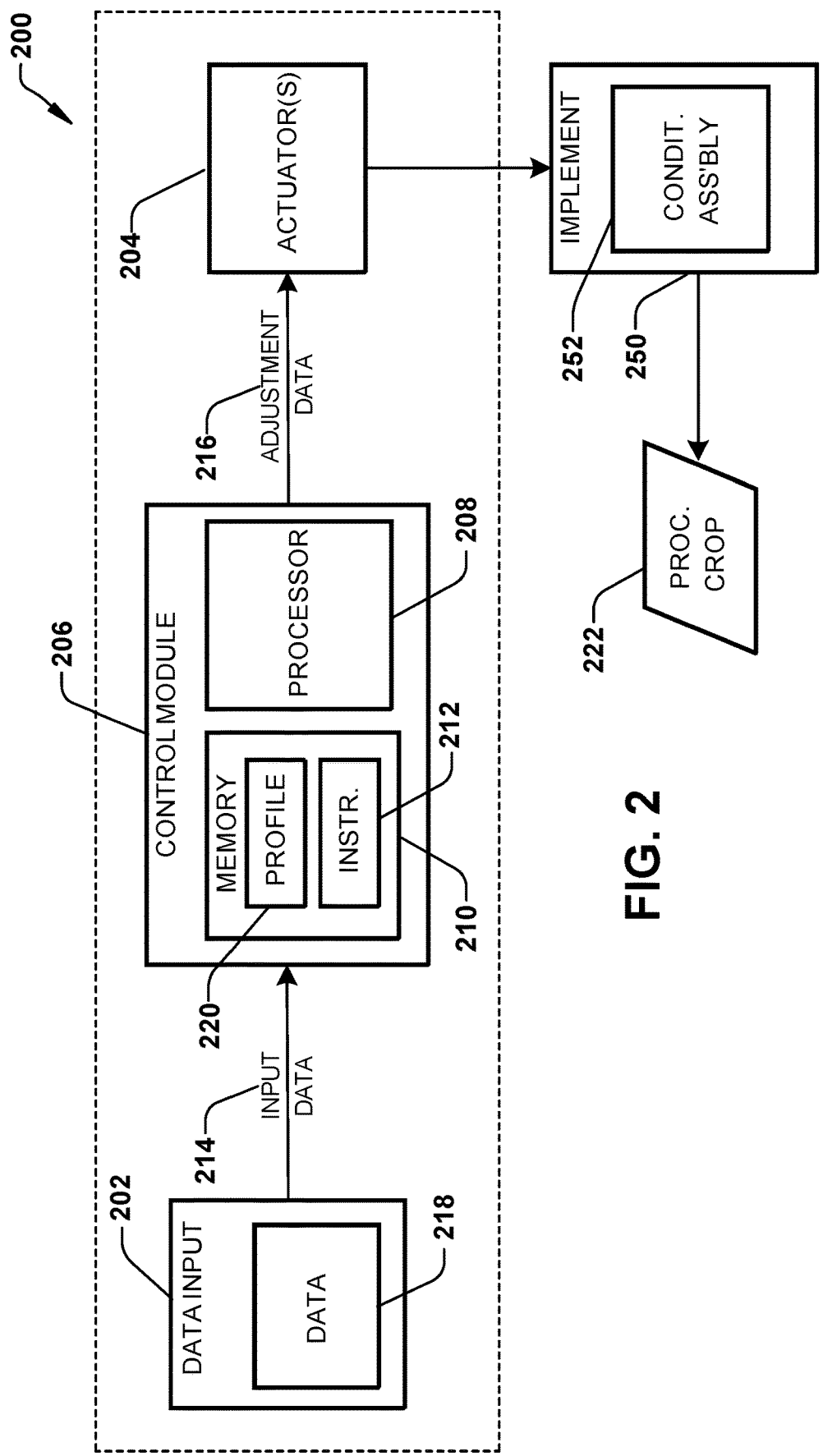
FIG. 2 is a schematic diagram illustrating one implementation of an example systems that can be used to perform roller gap adjustment, as described herein.
Figure 3B:
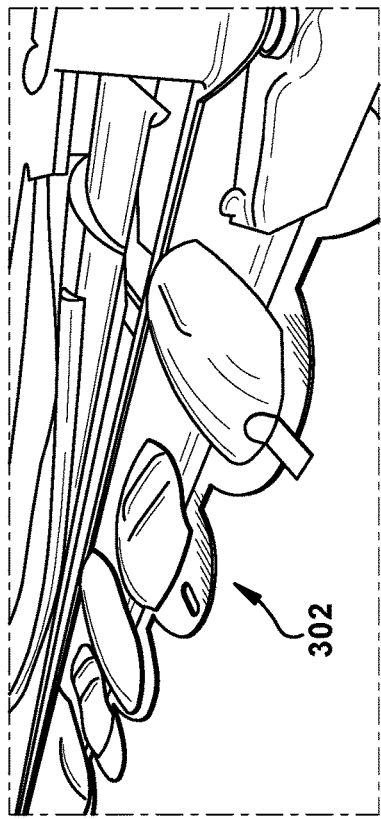
FIGS. 3A, 3B, 3C, and 3D are component diagram illustrating one example implementation of one or more portions of one or more systems as described herein.
Figure 3D:
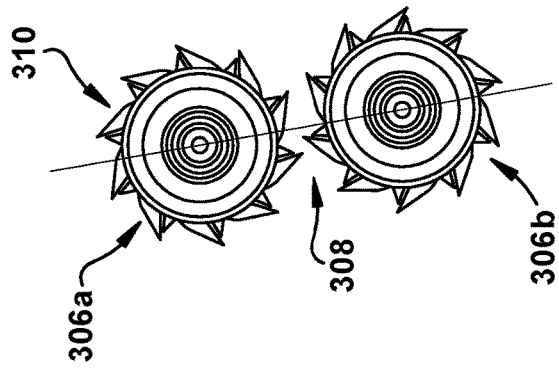
Figure 3A:
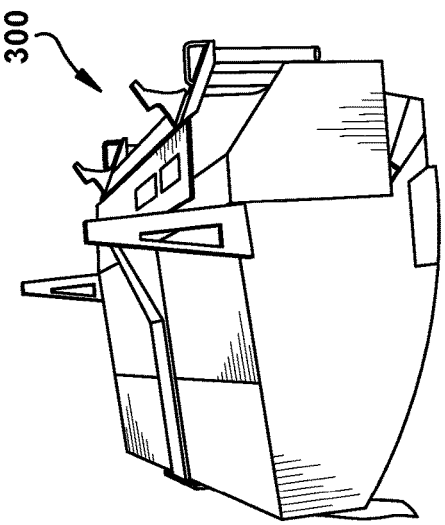
Figure 3C:
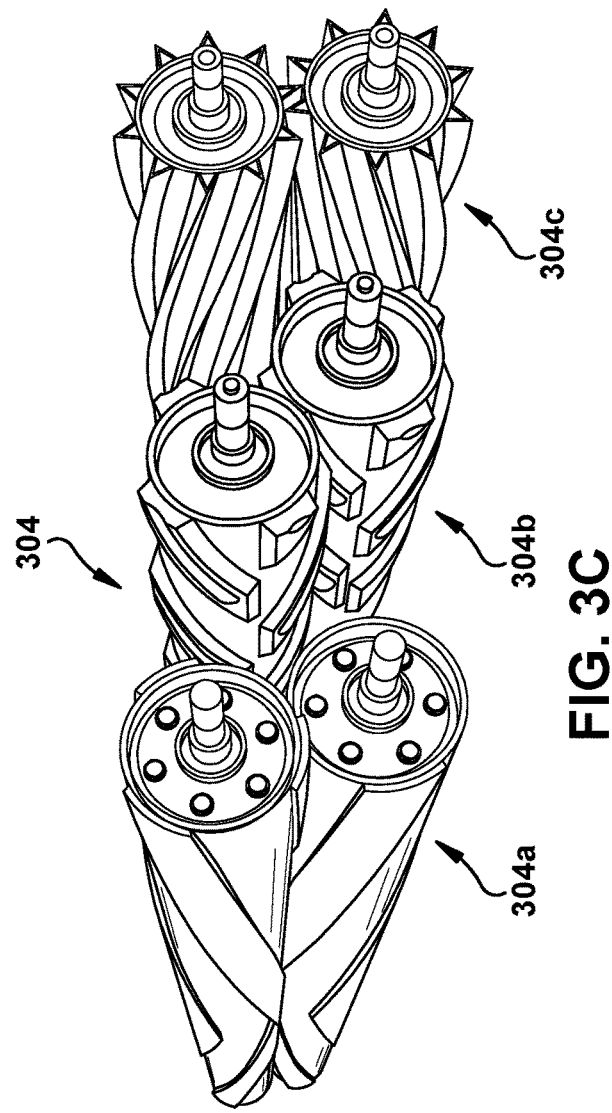

FIG. 2 is a schematic diagram illustrating one example implementation of a system 200 for improving conditioning of a cut crop during harvesting. In this implementation, the system 200 comprises a data input component 202, such as a database, crop model, user interface, cloud-based data, etc., (e.g., disposed remotely or in vehicle). The data input component 202 may also comprise a sensor array comprising one or more sensors to detect mass flow rate of incoming crop (e.g. electromagnetic radiation attenuation sensor), crop moisture content (e.g. capacitive sensor, electromagnetic emitter/detector pair), crop vegetative index such as NDVI (e.g. camera sensitive to NIR and visible light), leaf loss due to mowing and conditioning (e.g. one or more cameras and image processing to quantify leaf loss), and other crop conditions. The input component 202 creates, comprises, or receives data related to crop moisture characteristics, target crop moisture characteristics, and crop dry-down characteristics. The data input component 202 collects input data 214 indicative of characteristics relevant to developing a crop conditioning profile. That is, for example, crop dry-down rate data may be known for target crops, having known moisture content (e.g., dry-down rate table). Further, the dry-down rate may be known for various conditioning profiles, such as no conditioning, single conditioning, and double conditioning. As such, for example, in order to reach a desired moisture content within a target time duration, a selected conditioning profile can be selected to reach the target moisture and time. Therefore, the input data 214 can comprise the moisture level of the target crop, the target crop moisture level (after dry-down), and the target time for collecting the conditioned crop (dry-down time).

In FIG. 2, the example system 200 comprises a control module 206 that is configured to receive the input data 214 and transmits adjustment data 216. That is, for example the control module 206 comprises a computer processor 208, that is configured to process data and instructions, and provide resulting data based on the processed data and instructions. Additionally, the control module 206 comprises memory 210 (e.g., computer memory, such as a device or system that is used to store information for use in a computer or related computer hardware and digital electronic devices, including short and long-term memory, temporary and permanent memory, and the like). In this implementation, the memory 210 stores instructions 212 that are configured to, when processed by the computer processor 208, generate adjustment data 216. The adjustment data 216 is generated by an analyzer (e.g., trained machine learning model) that determines an amount and type of adjustment may be needed to result in a desired crop conditioning for a processed crop 222. That is, a target crop profile 220 comprising data that is indicative of the determined amount of equipment adjustment, which is based at least upon the input data 214, the equipment specification, etc., resulting in the desired crop conditioning for the processed crop 222. That is, for example, a machine learning model can be trained on data indicative of desired crop conditions, such as desired dry-down time, amount or type of conditioning, type of crop, weather conditions, environmental conditions, etc. In this way, the trained model can result in a stored algorithm that identifies the adjustment or specifications for the implement 250 and conditioning assembly 252, which will produce the desired processed crop 222 in the amount of time selected by the operator, given the existing environmental conditions.

In the example system 200, one or more actuators 204 can be used to adjust a conditioning assembly 252 (e.g., roller assembly) of a windrower implement 250, on the fly based at least on received adjustment data 216. For example, the roller assembly can comprise one or more sets of rollers. Each set can be adjusted by changing a roller gap, roller tension, and/or roller speed, which can adjust the crimping characteristics of the crop. Further, one or more sets of rollers can be activated to multiply treat the crop. That is, if one set is activated the crop is merely treated once. If more than one set of rollers is activated, the crop can be treated multiple times. In some examples, the sets of rollers may be identical. In other examples, the sets may be different. The differences may be related to the crop engaging surface of the rollers such as the raised pattern, the height/depth of the pattern, the pitch of surface elements such as spiral raised/sunk features, material, or other. In some examples the difference may be related to the diameter of the rollers. Within a set of rollers, there may be differences like those just described.

As an example, in FIGS. 3A, 3B, 3C, and 3D an example windrower implement can comprise a header 300 that is coupled to a vehicle, such as a tractor (e.g., 102 of FIG. 1). The header 300 comprises a set of cutters 302, such as rotating cutter blades, arranged in the front of the header 300 to cut down the target crop as it enters the header 300. Rearward of the cutters 302 is disposed one or more sets of rollers 304 that are configured to condition the target crop as it is drawn through the header 300 from the front to the rear. That is, for example, a first set of rollers 306a, b can be arranged with a gap 308 therebetween that is configured to allow the target crop to pass between the cutters, while crimping and/or pressure is applied to the crop passing through. Further, additional sets of rollers 304 can comprise a variety of designs 304a, b, c that can include ridges, treads, or other features in a desired pattern that applies a desired amount or type of crimping, depending on the target crop.

In some implementations a first roller 306a may be configured to translate toward and away from a second roller 306b along an axis of translation 310, while roller 306b remains stationary. In other configurations, roller 306b may be translatable, while roller 306a remains stationary. In other configurations both rollers 306a, 306b may translate along the axis of translation 310. In this way, in this configuration, the gap 308 can be affectively decreased and increased. With continued reference to FIG. 2, in one example, the adjustment data 216 received by the actuator(s) 204 can result in the actuator(s) 204 increasing or decreasing the gap 308 between the rollers 306a, 306b during operation of the header 300. In this way, the amount and type of conditioning (e.g., crimping) of the target crop can be adjusted during operation (e.g., harvesting), on-the-fly. As another example, a speed can be adjusted for respective one or more roller set 306, 304; and merely the first set 306 may be activated; or additional sets 304a, 304b, 304c can be activated to provide additional conditioning. The data input to the analyzer can help determine the amount and type of crimping needed to meet crop conditioning profile 220, which determines the adjustments needed to meet that profile.

As an example, an operator may determine that a specified amount of conditioning and/or crimping is desired for a target crop to meet a moisture profile, within a desired number of days. In this example, the information may be based on the type of crop, the crop conditions, the field conditions, type of equipment, and/or the weather conditions (present and future), and the desired end result. For example, as described above, and increase in crimping can provide for a decrease in drying time for the target crop, which may be desirable when there is a smaller time window for harvesting (e.g., expected wet condition, expected rain, larger area for harvest, etc.). Further, different crops may have different conditioning requirements, such as those with different stem dimensions, foliage, lengths, and density or volume. Based on this information and more, the operator can select a desired conditioning, and therefore target crop input data, that will achieve a target drying time while mitigating leaf loss from the crop to an acceptable level. In some implementations, the operator may input the desired drying time and can select the conditioning applied based on the moisture profile (e.g., and predicted leaf loss).

Figure 4:
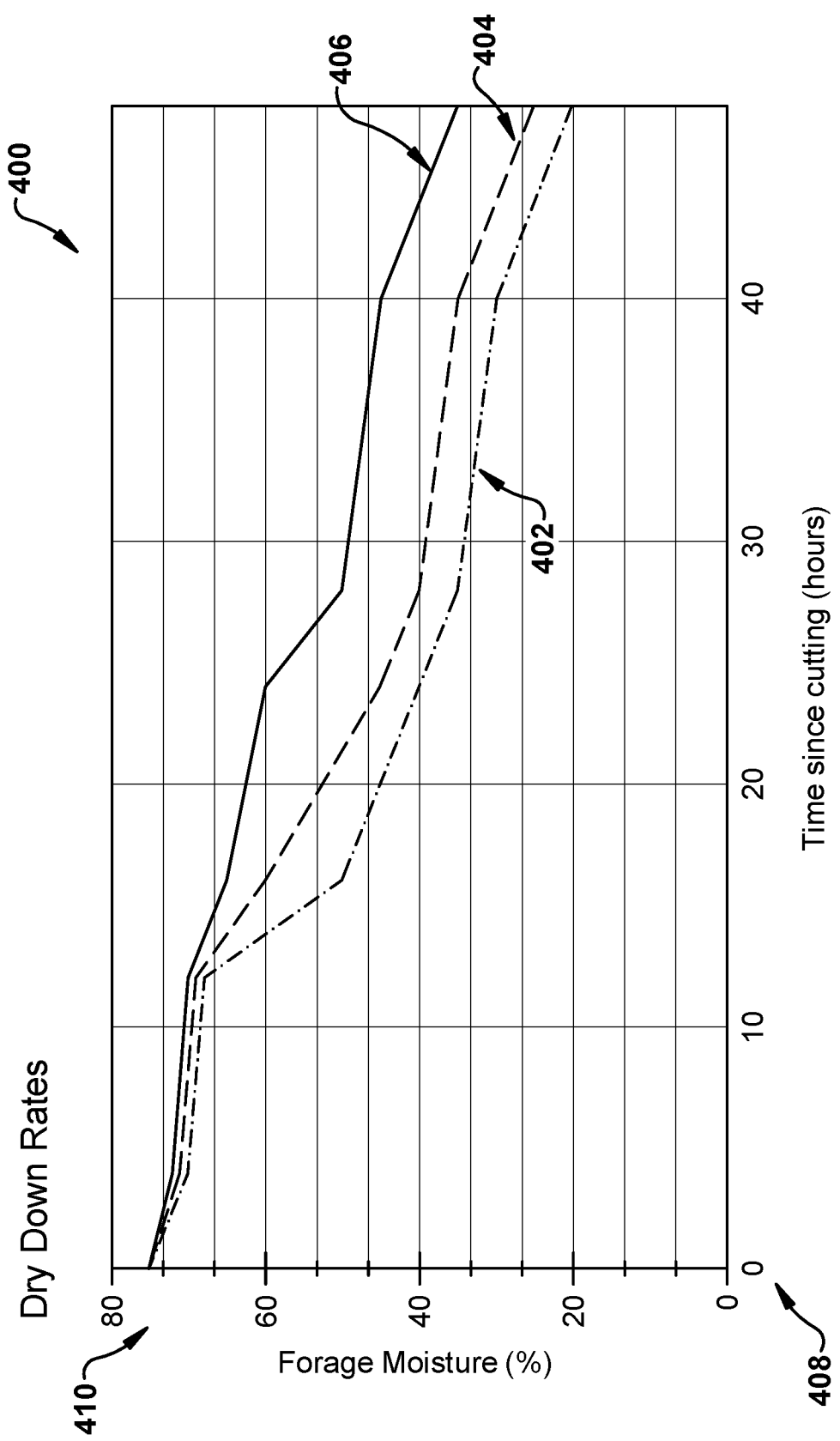
FIG. 4 is a graphical representation of data indicative of dry-down times associated with moisture content and conditioning characteristics.

FIG. 4 is a graphical diagram illustrating an example dry-down rate chart 400. In this example, the chart 400 show three different dry-down rates 402, 404, 406. Rate 402 illustrates a drying time for a non-conditioned crop, with moisture level 410 in the Y axis, and days of dry-down time 408 in the X axis. Notably, the dry-down rate is slower than that of the single-conditioned crop rate 404, and the double-conditioned crop rate 402. As illustrated, an analysis (e.g., using the control module 206) of a desired dry-down time 408, based on a crop moisture level 410, can be identified by cross referencing the chart. Further, if an accelerated dry-down time is desired, additional conditioning (e.g., double conditioning 402) can be applied.

Further, Table 1, below, illustrates a dry-down chart that generally corresponds to the graphical illustration of FIG. 4. In this table, the crop moisture level is illustrated for respective "no conditioning," "single conditioning," and "double conditioning." As illustrated, the double conditioning column illustrates increased dry-down when compared to the single and no conditioning columns.

TABLE 1

|  | No Cond | Single Cond | Double Cond |
| --- | --- | --- | --- |
| 0 | 75 | 75 | 75 |
| 4 | 72 | 71 | 70 |

TABLE 1-continued

|  | No Cond | Single Cond | Double Cond |
| --- | --- | --- | --- |
| 12 | 70 | 69 | 68 |
| 16 | 65 | 60 | 50 |
| 24 | 60 | 45 | 40 |
| 28 | 50 | 40 | 35 |
| 40 | 45 | 35 | 30 |
| 44 | 40 | 30 | 25 |
| 48 | 35 | 25 | 20 |

Additionally, in some implementations, the data can be collected at regular intervals (e.g., or continually) and curated into a remote operations center, and loaded to a database with spatial and temporal indexing capabilities. As one example, the data may be analyzed as it is collected, and then, in combination with the location and time information, and the data records, determine potential adjustments for known equipment dimensions and characteristics. In this example, adjustments are identified, an adjustment record may be created or extended for the equipment receiving the load that contains pre-determined load metrics and characteristics, such as crop characteristics. As an example, this collection and curation of the data can be done automatically based on the load signals, location, and time match without need for operator intervention.

Figure 5A:
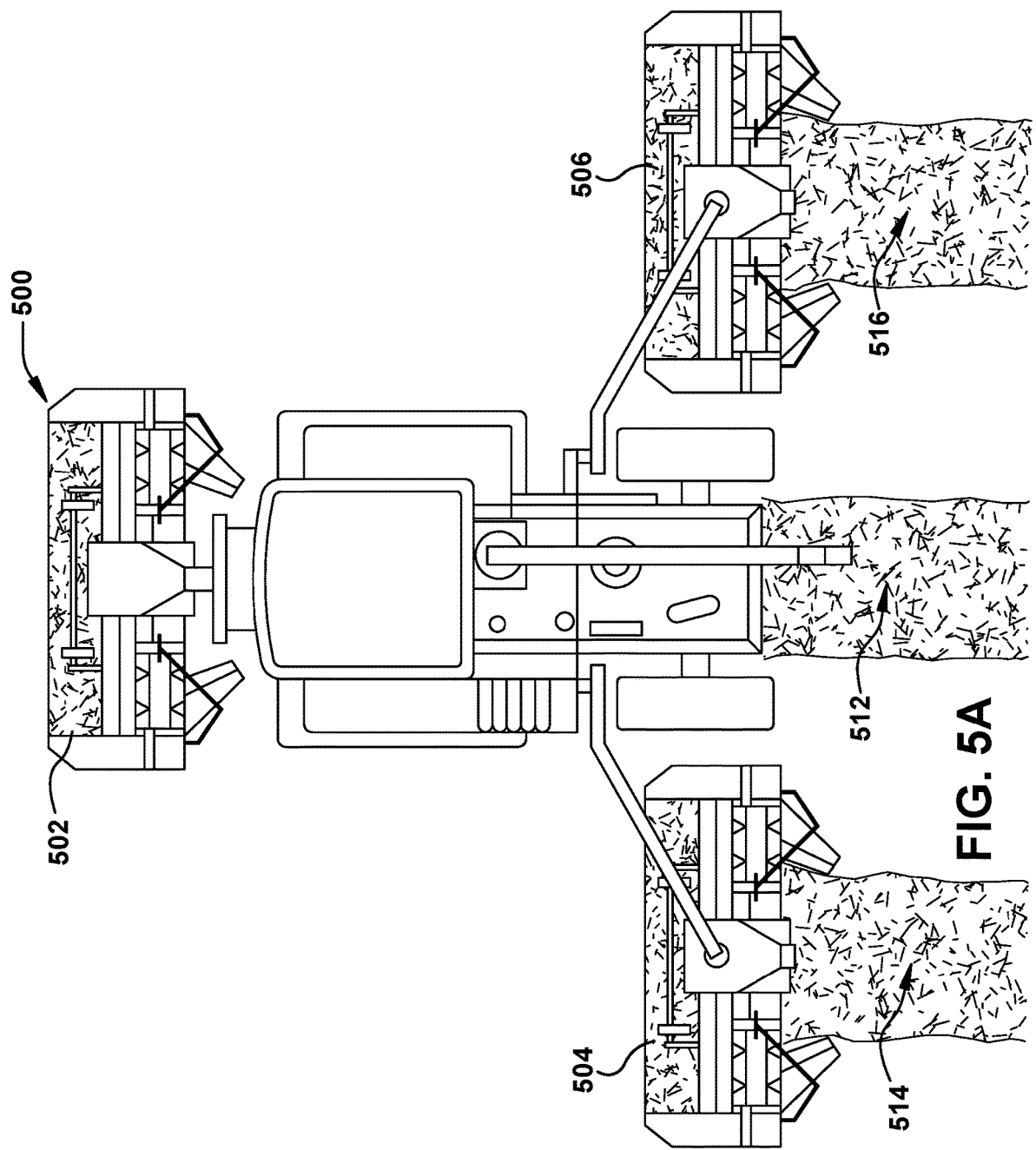
FIGS. 5A and 5B are component diagram illustrating example implementations of one or more portions of one or more systems as described herein.
Figure 5B:
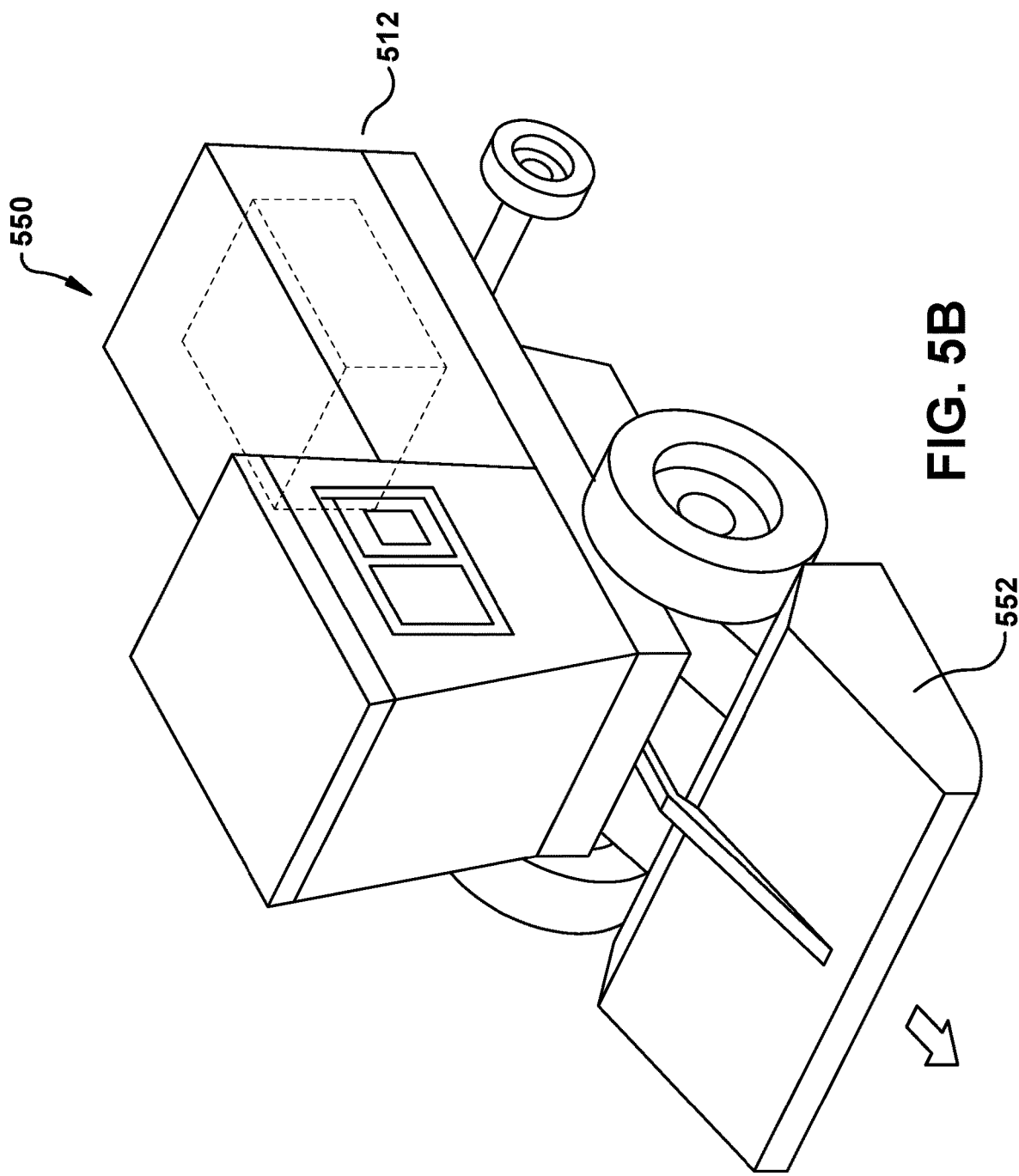

FIGS. 5A and 5B are component diagrams that illustrate example implementations where one or more systems, described herein, may be utilized. In this example, harvesting vehicles 500, 550, respectively operate harvesting implements 502, 504, 506, 552 (e.g., windrower machines or implements, such as towed windrowing implements that cut crop and form windrows). Vehicle 500 has a front implement 502 that collects and conditions a first conditioned crop 512, such as into a windrow. Two side implements 504, 506 respectively collect and condition a second and third conditioned crop 514, 516 into their own windrows. In FIG. 5B, a single harvesting implement 552 collects and conditions a single conditioned crop 512. As illustrated, vehicle 500 with its three implements 502, 504, 506 can harvest and condition a greater amount of the crop than vehicle 550. Additionally, as described herein, conditioning assemblies in the respective implements 502, 504, 506 can be independently adjusted.

That is, for example, based on the target crop conditions (e.g., and other conditions described above) the respective implements may have different (e.g., or the same) settings for the conditioning assemblies (e.g., roller assemblies). As an example, the amount of crop input to any of the assemblies, and/or the moisture content of received crop, may necessitate independent adjustment in real-time, in order that the conditioned crop 514, 512, 516 meets the target threshold. In one implementation, the vehicle 502 can utilize a plurality of windrower machines, where respective machines receive independent adjustment data that is separate and/or different than that of another machine's. For example, the actuator controller (e.g., control module 206) can generate first actuator adjustment data for a first windrower implement (e.g., 502), and generate second actuator adjustment data (e.g., which may be different or the same) for a second windrower implement (e.g., 504, and/or 506).

Figure 6:
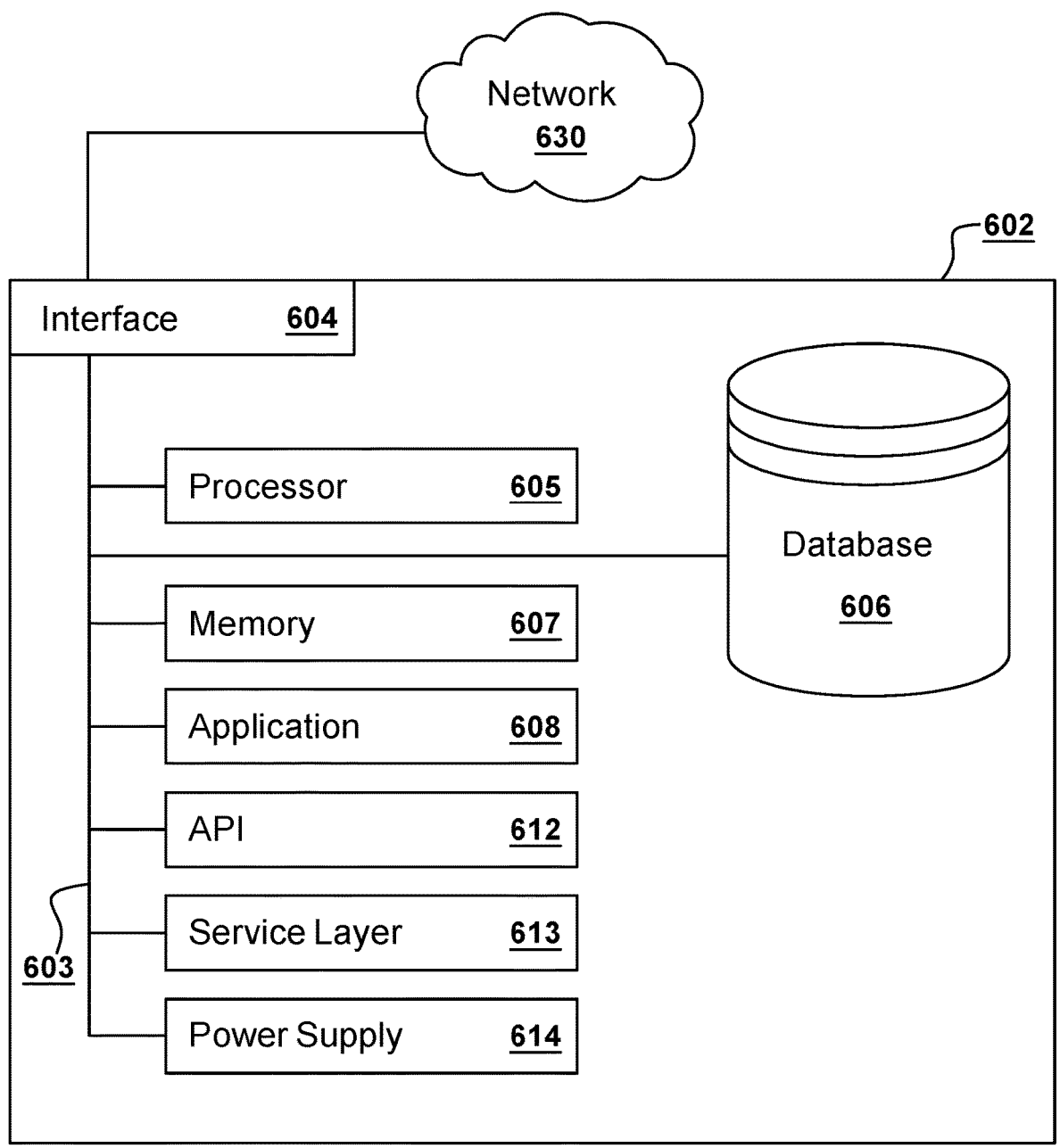
FIG. 6 is a schematic diagram of an example computer system that can be used to provide computational functionalities associated with methods and systems described herein.

FIG. 6 is a schematic diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for automatically adjusting a crop conditioner assembly on a windrower machine, comprising: an actuator controller that operably receives input data indicative of: a current crop moisture characteristic; a target crop moisture characteristic; and a crop dry-down characteristic, the control module comprising: a computer processor; and memory that stores instructions configured to, when processed by the computer processor, generate actuator adjustment data indicative of an adjustment to a crop conditioner assembly in a windrower machine to meet a predetermined crop conditioning characteristic based at least upon the current crop moisture characteristic, target crop moisture characteristic, and crop dry-down characteristic; wherein, the one or more actuators are configured to adjust one or more of: a speed of one or more sets of rollers in a roller assembly of the crop conditioner assembly; a pressure exerted by the one or more sets of rollers on the target crop; a distance between each roller in the one or more sets of rollers; and a number of active sets of rollers in the roller assembly; and the one or more actuators adjust the crop conditioner assembly of the windrower implement based at least on the adjustment data.

2. The system of claim 1, the one or more actuators further configured to adjust a speed of the windrower machine.

3. The system of claim 1, comprising a sensor array comprising a moisture sensor configured to detect moisture content of the target crop indicative of the current crop moisture characteristic.

4. The system of claim 3, the sensor array comprising a mass flow sensor configured to detect a mass flow of the target crop into the windrower machine.

5. The system of claim 3, the sensor array comprising a pressure sensor configured to identify an amount of pressure exerted by rollers in one or more of the sets of rollers of a roller assembly on the target crop.

6. The system of claim 3, the sensor array comprising a speed sensor configured to identify a speed of the windrower machine.

7. The system of claim 1, the windrower machine comprising an implement that cuts, conditions, and lays the target crop into windrows for in-field dry-down.

8. The system of claim 1, the windrower machine comprising a forager implement that cuts, conditions, and provides the target crop to an in-field collection vehicle.

9. The system of claim 1, the stored instructions comprising a machine learning model comprising data indicative of an amount of time to dry-down the target crop based on a current moisture content of the target crop and a conditioning profile used to meet the amount of time.

10. The system of claim 9, the stored instructions further configured to utilize sensor data from a plurality of sensors in the sensor array in machine learning model to identify the adjustment data.

11. The system of claim 1, comprising a plurality of windrower implements, respective windrower implements receiving actuator adjustment data independent from another windrower implement.

12. The system of claim 11, the actuator controller generating first actuator adjustment data for a first windrower implement, and generating second actuator adjustment data for a second windrower implement.

13. The system of claim 1, comprising a user interface configured to:
- display one or more of: the current crop moisture characteristics, the target crop moisture characteristics, the crop dry-down characteristics, actuator adjustment data, pre-determined crop conditioning characteristics; and
- to receive user input indicative of one or more of: the data indicative of the current crop moisture characteristics, the target crop moisture characteristics, the crop dry-down characteristics.

* * * * *